United States Patent [19]

Glaze et al.

[11] Patent Number: 4,754,847

[45] Date of Patent: Jul. 5, 1988

[54] INTERAXLE DIFFERENTIAL FOR TANDEM AXLE ASSEMBLY

[75] Inventors: Jack G. Glaze, Fort Wayne; Terry L. Oster, Auburn, both of Ind.

[73] Assignee: Dana Corporation, Toledo, Ohio

[21] Appl. No.: 947,983

[22] Filed: Dec. 31, 1986

[51] Int. Cl.$^4$ .................. F01M 9/10; F16H 57/04
[52] U.S. Cl. ................................ 184/6.12; 74/467
[58] Field of Search .............. 184/6.12; 74/467, 710.5, 74/665 GC

[56] References Cited

U.S. PATENT DOCUMENTS

| | | | |
|---|---|---|---|
| 2,015,108 | 9/1935 | Harper | 74/467 |
| 2,033,246 | 3/1936 | Keese | 184/11.1 |
| 2,247,732 | 7/1941 | Paton | 184/6.12 |
| 3,441,106 | 4/1969 | Taylor et al. | 184/6.12 |
| 3,719,253 | 3/1973 | Dukes | 184/6.12 |
| 3,762,503 | 10/1973 | Wilder | 184/6.12 |
| 3,901,092 | 8/1975 | Romick | 74/710.5 |
| 4,095,675 | 6/1978 | Bell | 184/6.12 |
| 4,227,427 | 10/1980 | Dick | 184/6.12 |
| 4,231,266 | 11/1980 | Nishikawa | 184/6.12 |
| 4,317,386 | 3/1982 | Ida | 74/467 |
| 4,319,499 | 3/1982 | Sanvi | 184/6.12 |
| 4,329,887 | 5/1982 | Kawamoto | 184/6.12 |
| 4,352,301 | 10/1982 | Fleury | 184/6.12 |
| 4,418,777 | 12/1983 | Stockton | 184/6.12 |
| 4,470,324 | 9/1984 | Renk | 74/467 |
| 4,480,493 | 11/1984 | Takahashi | 184/6.12 |
| 4,560,056 | 12/1985 | Stockton | 184/6.12 |

Primary Examiner—Carlton R. Croyle
Assistant Examiner—Jane E. Obee
Attorney, Agent, or Firm—MacMillan, Sobanski & Todd

[57] ABSTRACT

A tandem axle assembly includes an interaxle differential mechanism which includes a separate lubricant sump for providing lubrication to the interaxle differential during both initial start-up and normal running conditions. One of the interaxle differential side gears is disk-shaped, and includes internally formed side gear teeth in a planar rear face, internally formed clutch teeth in a planar front face, and external teeth around the radial periphery. The interaxle differential is coupled to divide power to two separate axle differential assemblies. Each axle differential assembly includes a pair of pinion gears having spherical gear seats and a pair of side gears having conical gear seats. Each axle differential assembly is rotatably supported within a housing by a pair of tapered roller bearings. The outer race of each bearing is located within an end of the carrier, while the inner race is positioned on a reduced diameter hub of a bearing retainer threaded into an opening in the housing. The opening in the housing is sized such that the bearing retainer having the inner race and an associated roller cage assembly thereon can be inserted therethrough during the assembly process.

10 Claims, 5 Drawing Sheets

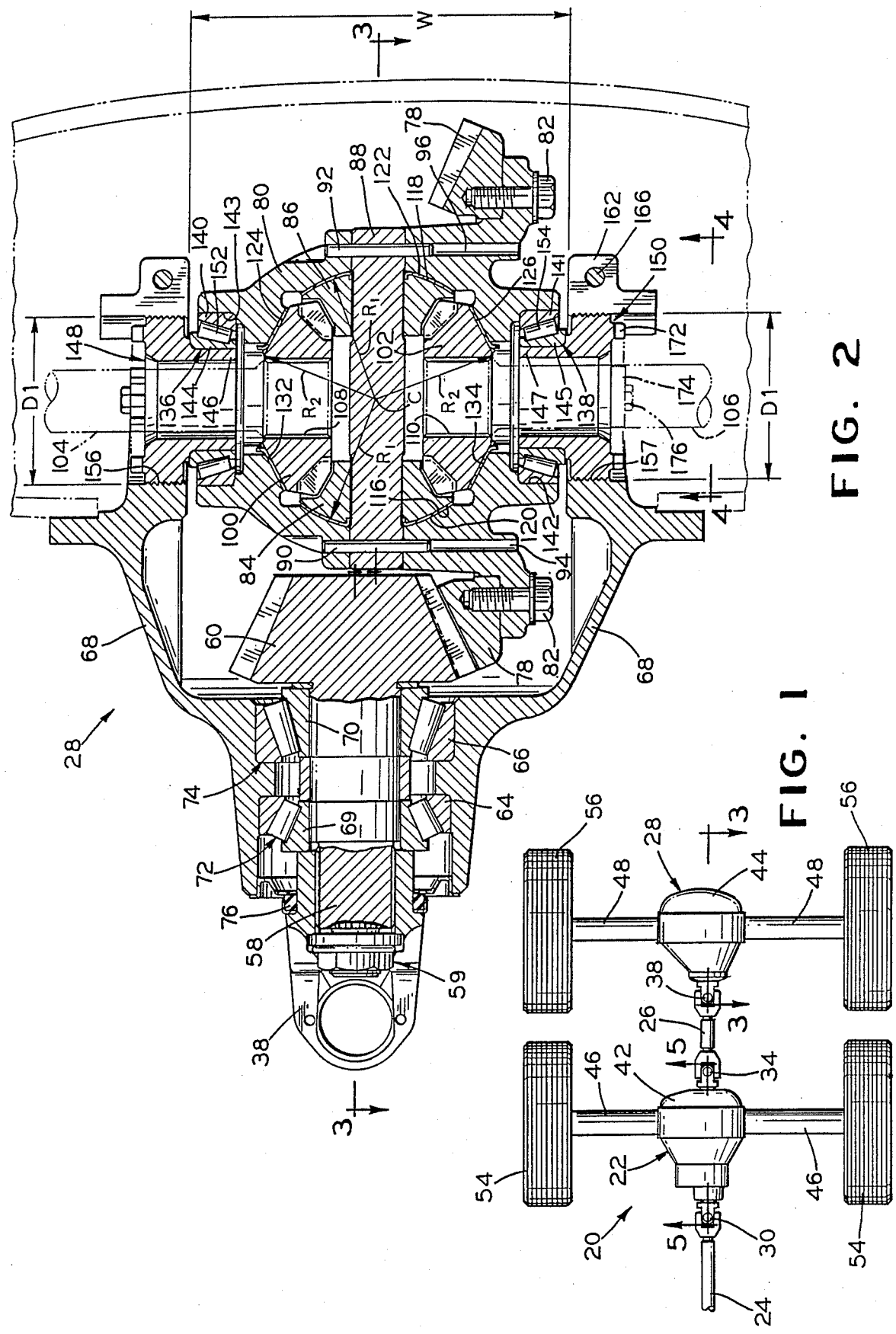

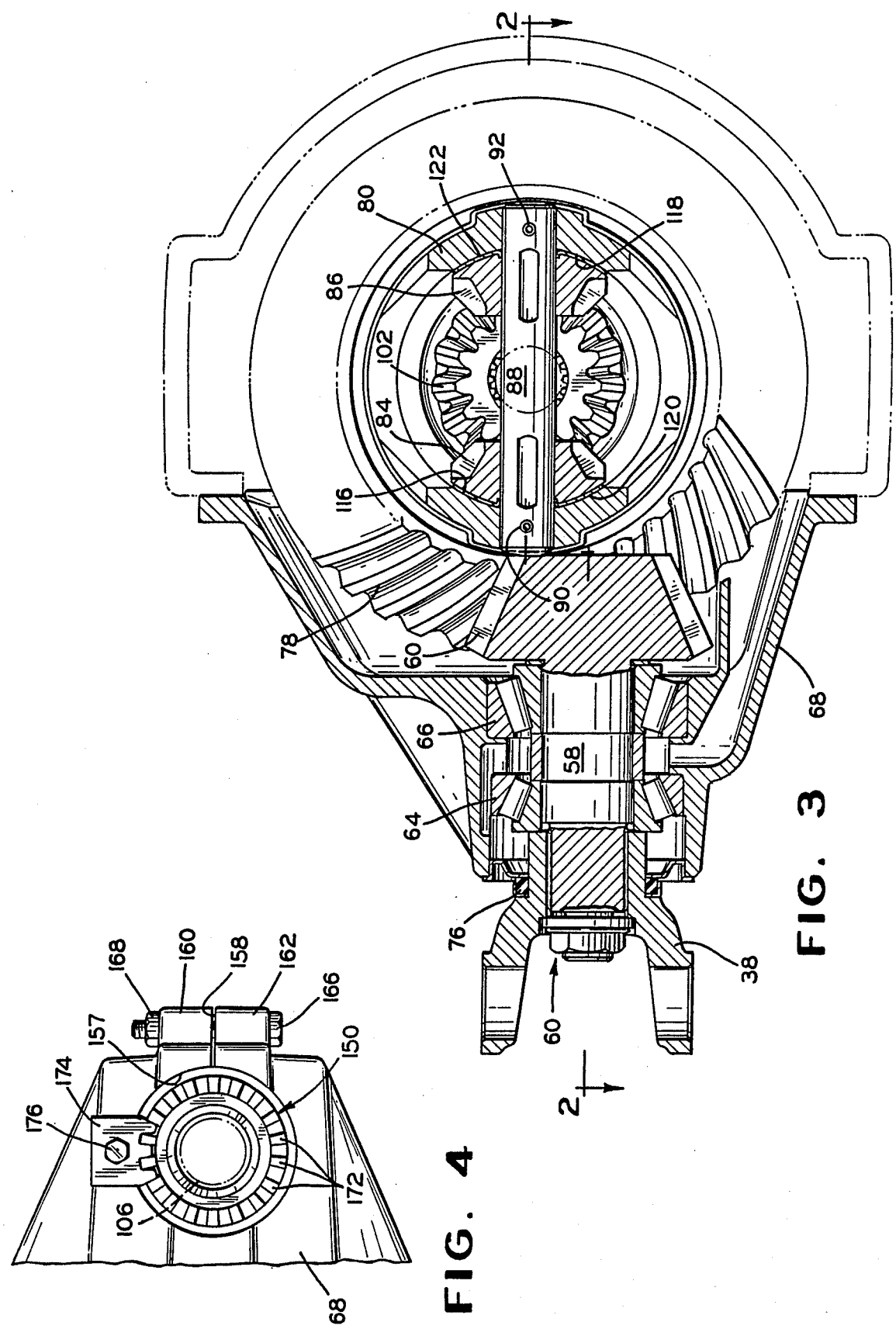

INTERAXLE DIFFERENTIAL FOR TANDEM AXLE ASSEMBLY

BACKGROUND OF THE INVENTION

The present invention relates generally to the field of tandem axle assemblies and, in particular, to an interaxle differential mechanism which, in accordance with the present invention, is provided with a lubricant sump for providing lubricating oil to the differential mechanism during both initial start-up and normal running conditions. The present invention also concerns a unique gear structure which is one component of the interaxle differential. The gear is disk shaped and is provided with integrally formed internal clutch and side gear teeth.

Interaxle differential mechanisms are typically provided in tandem axle assemblies for dividing power from a single drive shaft to two separate axle assemblies. Examples of conventional interaxle differential mechanisms are disclosed in U.S. Pat. Nos. 3,441,106 to Taylor et al. and 2,033,246 to Keese. While tandem axle assemblies having interaxle differential mechanisms have been used for a long time and many various designs have been proposed, there is a continuing effort being made to improve the construction of the interaxle differential in order to reduce its weight and improve its durability and operating characteristics.

For example, the above mentioned Taylor et al patent discloses an interaxle differential construction wherein a side gear of the differential includes external formed side teeth on one side, externally formed clutch teeth on the opposite side engageable with a locking mechanism, and a radial periphery provided with external teeth for transmitting power to one of the two axle differentials. It has been found that this type of structure reduces the number of components in the assembly.

Also, various systems have been proposed for providing lubrication to an interaxle differential, which is typically located in an upper portion of a housing which also encloses one of the two axle differential mechanisms. In this type of arrangement, the interaxle differential is not immersed in the main oil sump, and is typically lubricated by either an auxiliary oil pump or by oil thrown toward the differential by a rotating ring gear. However, such systems generally do not provide sufficient lubrication during initial start up conditions, resulting in undesirable wear of the associated components.

The above mentioned patent to Keese has proposed the use of a separate retaining plate which cooperates with the interaxle differential housing to define an area for retaining a portion of the oil supplied to the interaxle differential mechanism.

SUMMARY OF THE INVENTION

The present invention concerns a unique structure for providing a lubricant sump for a lower portion of an inter axle differential of a tandem axle assembly. Such a lubricant sump has been found to provide a sufficient supply of lubricating oil to the interaxle differential during both initial start-up and normal running conditions to prevent undesirable wear of these components.

More specifically, the interaxle differential assembly is rotatably supported within an associated housing. The housing includes means for at least partially enclosing at least a lower portion of the differential mechanism. An apertured cup member is affixed to the housing and is located between one of the side gears of the interaxle differential and the associated pinion gear carrier. An input shaft secured to the pinion gear carrier extends through the cup member. An annular seal means is positioned between the apertured cup member and the one side gear such that the housing, the apertured cup member, the annular seal means, and the side gear cooperate to define a lubricant sump for the interaxle differential mechanism.

In the preferred embodiment of the invention, the side gear of the interaxle differential which cooperates to define the lubricant sump is a disk-shaped gear means having a first generally planar surface which faces the differential pinion gear carrier. A plurality of side gear teeth are internally formed in the planar surface to define the associated side gear. Also, the annular seal means is positioned in a groove formed in the first planar surface, with the seal means including a sealing element for sealingly contacting an annular sealing surface on the apertured cup member.

Also, in accordance with the present invention, the disk-shaped gear means includes a second opposite planar surface having a plurality of internally formed clutch teeth for engagement with clutch teeth of an associated locking means. The locking means functions to lock the two side gears of the interaxle differential mechanism together, such that power is transmitted directly to each axle differential. Further, the disk-shaped gear means is provided with a radial periphery defining a plurality of gear teeth adapted to engage and drive an output gear connected to an output shaft coupled to drive one of the axial differentials. It has been found that such a gear construction, simplifies the assembly of the differential unit, while also reducing the overall axial length of the unit.

The above, as well as other advantages of the present invention, will become readily apparent to one skilled in the art from reading the following detailed description of the preferred embodiment of the invention in conjunction with the attached drawings.

BRIEF DESCRIPTION OF THE DRAWINGS

FIG. 1 is a top plan of a tandem axle assembly which incorporates the features of the present invention;

FIG. 2 is a sectional view of the rear differential of the tandem axle assembly of FIG. 1, taken along the line 2—2 in FIG. 3;

FIG. 3 is a sectional view of the rear differential of FIG. 2 taken along the lines 3—3 in FIGS. 1 and 2;

FIG. 4 is a side elevational view taken along line 4—4 in FIG. 2, and showing the bearing retainer locking means utilized with the invention;

DESCRIPTION OF THE PREFERRED EMBODIMENT

Figure 5:
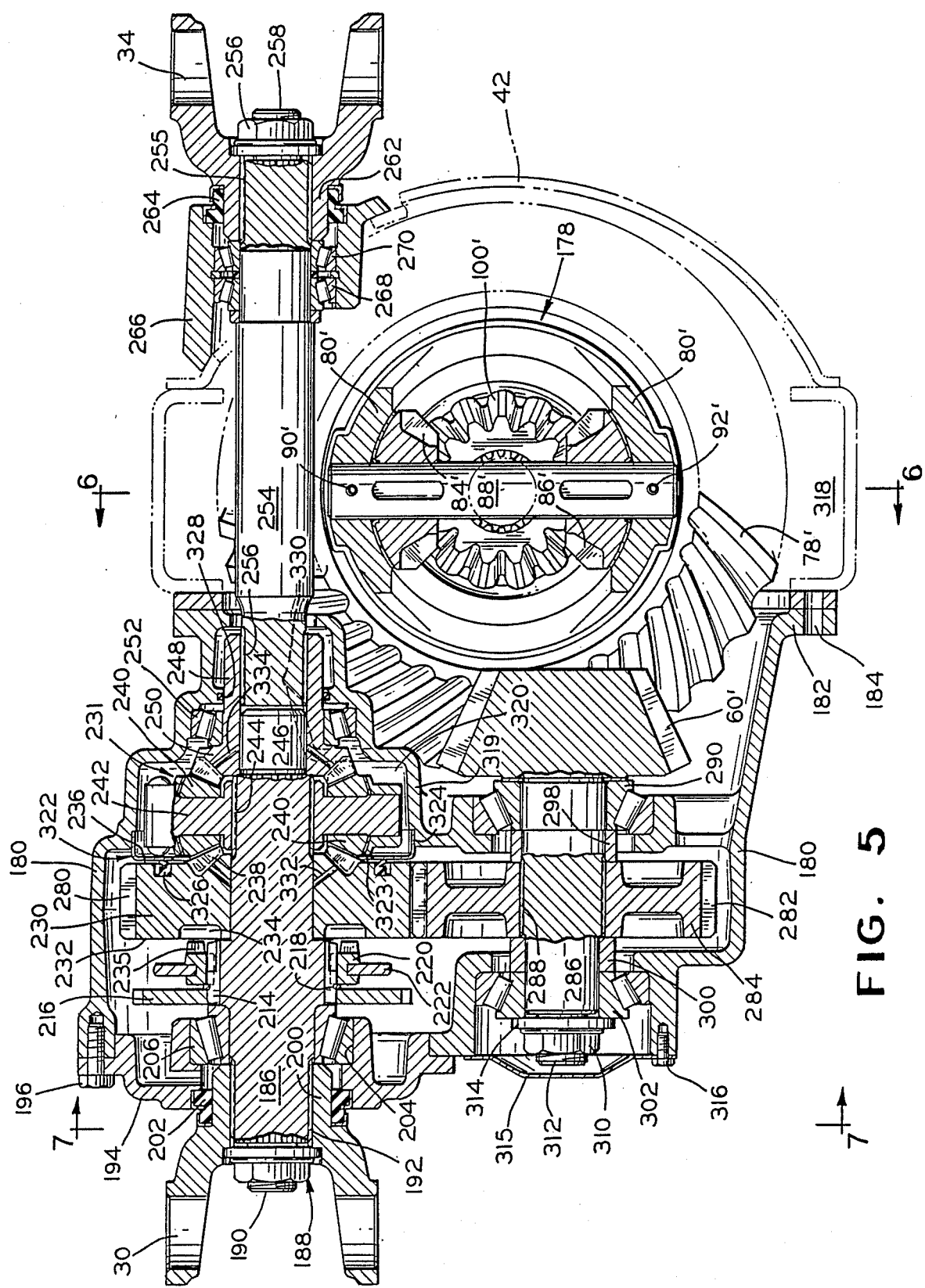
FIG. 5 is a sectional view of the interaxle front differential of FIG. 1, taken along the lines 5—5 in FIGS. 1 and 6.

Turning first to FIG. 1, there is shown a tandem rear axle assembly 20 including an interaxle front differential 22 driven through a drive shaft 24 and driving an intermediate drive shaft 26, which in turn drives a rear differential 28. Since both differentials 22 and 28 are adapted to drive rear wheels, the differential 22 is sometimes referred to as a "front-rear" differential, while the differential 28 is referred to as a "rear-rear" differential. It will be appreciated that the features of the invention may be applied to various types of differentials, including a two-speed differential mechanisms and a single axle differential mechanism.

As illustrated, the interaxle front differential 22 is driven at its input yoke 30 by a conventional universal joint assembly, and drives the intermediate drive shaft 26 through an output yoke 34, connected to the front end of the intermediate drive shaft 26 by a universal joint assembly. The rear end of the drive shaft 26 is coupled to drive the rear differential 28 at an input yoke 38 by a universal joint assembly. The differentials 22 and 28 include outer housings 42 and 44 having integral axle housing portions 46 and 48 which in turn support the respective rear wheel assemblies 54 and 56.

Turning now to FIG. 2, there is shown a top sectional view of the single rear differential 28. As illustrated, the input yoke 38 is fastened to the forward end of an input pinion shaft 58 by a fastening means 59, shown as a nut and washer fastened to a threaded stud integral with the shaft 58. The rear end of the input shaft 58 carries an input pinion gear 60. The shaft 58 is rotatably supported within a differential housing 68 by a pair of opposed tapered roller bearing assemblies 72 and 74. The roller bearing assemblies have respective outer races 64 and 66 which are fixed with respect to the differential housing 68. The bearing assemblies have inner races 69 and 70 which are fixed with respect to the shaft 58. A conventional annular seal means 76 is provided at the forward end of the input shaft 58 between the yoke 38 and the housing 68.

In a conventional fashion, the input pinion gear 60 drives a ring gear 78 which is fastened to a differential gear case 80 by a plurality of bolts 82. The differential gear case 80 defines a chamber for receiving a pair of spaced apart differential pinion gears 84 and 86. The pinion gears 84 and 86 are rotatably supported on a shaft 88 secured to the case 80 by pins 90 and 92 which are located in bores 94 and 96, and pass through corresponding apertures in the ends of the shaft 88.

A pair of side gears 100 and 102 mate with pinion gears 84 and 86 and are respectively splined to the inner ends of axle shafts 104 and 106 (shown in phantom) at splined portions 108 and 110. The pinion gears 84 and 86 have respective spherical faces 116 and 118 which are received in corresponding spherical seats formed in the case 80. Spherical thrust washers 120 and 122 are positioned between the spherical pinion gear faces 116 and 118 and the respective spherical seats. The spherical faces 116 and 118 and the associated spherical seats are defined by spherical surfaces of radius $R_1$ having a generating center point (Pt.C) lying on the axis of rotation of the pinion gears 84 and 86.

To reduce the width and weight of the differential mechanism, the side gears 100 and 102 are provided with conical faces 124 and 126, which are symmetrical, and have an axis of generation aligned with the axis of rotation of the gears 100 and 102. These conical faces are received in respective conical seating areas formed in the case 80. Conical thrust washers 132 and 134 are positioned between the conical gear faces 124 and 126 and the respective conical seating areas. In order to reduce the overall axial width of the differential, the conical seats are preferrably formed to such that the distance $R_2$ (shown in FIG. 2) from point C the portions of the conical surfaces adjacent the splined portions 108 and 110 is less than the radius $R_1$. This results in the maximum spacing between the back surfaces of the side gears along the axis of rotation of the side gears being less than the maximum spacing between the back surfaces of the pinion gears along the axis of rotation of the pinion gears. However, it will be appreciated that, in some instances, it may be desirable to have the radius $R_1$ be less than the radius $R_2$.

The differential gear case 80 is rotatably supported within the differential housing 68 by a pair of tapered roller bearings 136 and 138. The bearings 136 and 138 have respective outer races 140 and 141 which are press fit within annular recesses 142 and 143 formed in the ends of the case 80, and inner races 144 and 145 which are press fit over inner hub portions 146 and 147 of externally threaded bearing retainers 148 and 150. The inner races 144 and 145 carry bearing roller cages 152 and 154 respectively.

Turning now to FIGS. 2 and 4, there is shown a means for securing the bearing retainers 148 and 150 in a selected adjusted position. As illustrated, the differential housing 68 defines axially aligned spaced apart threaded bores 156 and 157 for the reception of the bearing retainers 148 and 150. The bores 156 and 157 are formed of a diameter D1 which is greater than the outermost diameter of the bearing roller cages 152 and 154. As will be discussed below, this greatly facilitates the assembly of the differential mechanism by enabling the retainers 148 and 150 to be inserted in the respective threaded bores with the associated inner races and bearing cages mounted thereon.

As shown in FIG. 4, the housing 68 is split at a line 158, which terminates at the threaded bore 157. The housing 68 is provided with projections 160 and 162 defining the split line 158. The projections 160 and 162 are provided with colinear apertures for retaining a clamping bolt 166, which is fastened with a nut 168. By adjusting the clamping bolt 166, the threaded bore 157 may be tightened around the threaded bearing retainer 150 in a preliminary manner to prevent the unintended movement of the bearing retainer 150 as the bearing 138 is being adjusted. As a final step after the bearing 138 has been adjusted, the bolt 166 can be tightened to close the split line 158.

In addition, the bearing retainer 150 has an annular toothed or castellated portion defining a plurality of outwardly extending teeth 172. A fingered locking plate 174 (shown in FIG. 4) engages at least two of the teeth 172 and is rigidly affixed to the housing 68 by means of a bolt 176 engaging a corresponding threaded bore in the housing 68. In this manner, the bearing retainer 150 may be adjusted in a stepwise manner under an appropriate amount of drag caused by the adjustment of the bolt 166 and, when appropriate adjustment is achieved, the fingered locking plate 174 is applied and fixed in position and the clamping bolt 166 is further tightened, yielding two separate and cooperating means for keeping the bearing retainer from becoming misadjusted during a long-extended service life. It will be appreciated that, in some instances, either the clamping bolt 166 or the locking plate 174 can be eliminated, and only a single means can be used to lock the bearing retainers. The other bearing retainer 148 can be provided with a similar adjusting and locking structure.

The method of assembling the differential gear case 80 and the bearings 136 and 138 is greatly facilitated by the structure of the present invention. Initially, the inner races 144 and 145 having the associated roller cages 152 and 154 mounted thereon are pressed onto the reduced diameter hub portions 146 and 147 of the respective bearing retainers 148 and 150. The respective bearing rollers 152 and 154 are maintained on the associated inner races as assemblies by conventional bearing cage members. Then, the outer races 140 and 141 are pressed into the annular recesses 142 and 143 in the ends of the differential gear case 80.

Next, the differential case 80 is inserted into the open rear end of the carrier housing 68, with the ring gear 78 engaging the input pinion gear 60. As illustrated in FIG. 2, the overall width of the differential case 80 is less than the width W of the opening provided in the rear end of the housing 68. Following this, the inner ends of the bearing retainers 148 and 150 having the bearing cages 152 and 154 mounted thereon are passed through the respective threaded bores 156 and 157 and seated within their respective outer races 140 and 141 as the bearing retainer means 148 and 150 are screwed into the threaded bores 156 and 157.

The adjustment of the bearing retainers 148 and 150 centers the case 80, and determines the proper engagement of the ring gear 78 and the input pinion gear 60, as well as establishing the proper preload on the bearings 136 and 138. After the proper engagement of the ring gear 78 and the input pinion gear 60 is established in the usual manner, the bearing retainers 148 and 150 can be locked in position.

Figure 6:
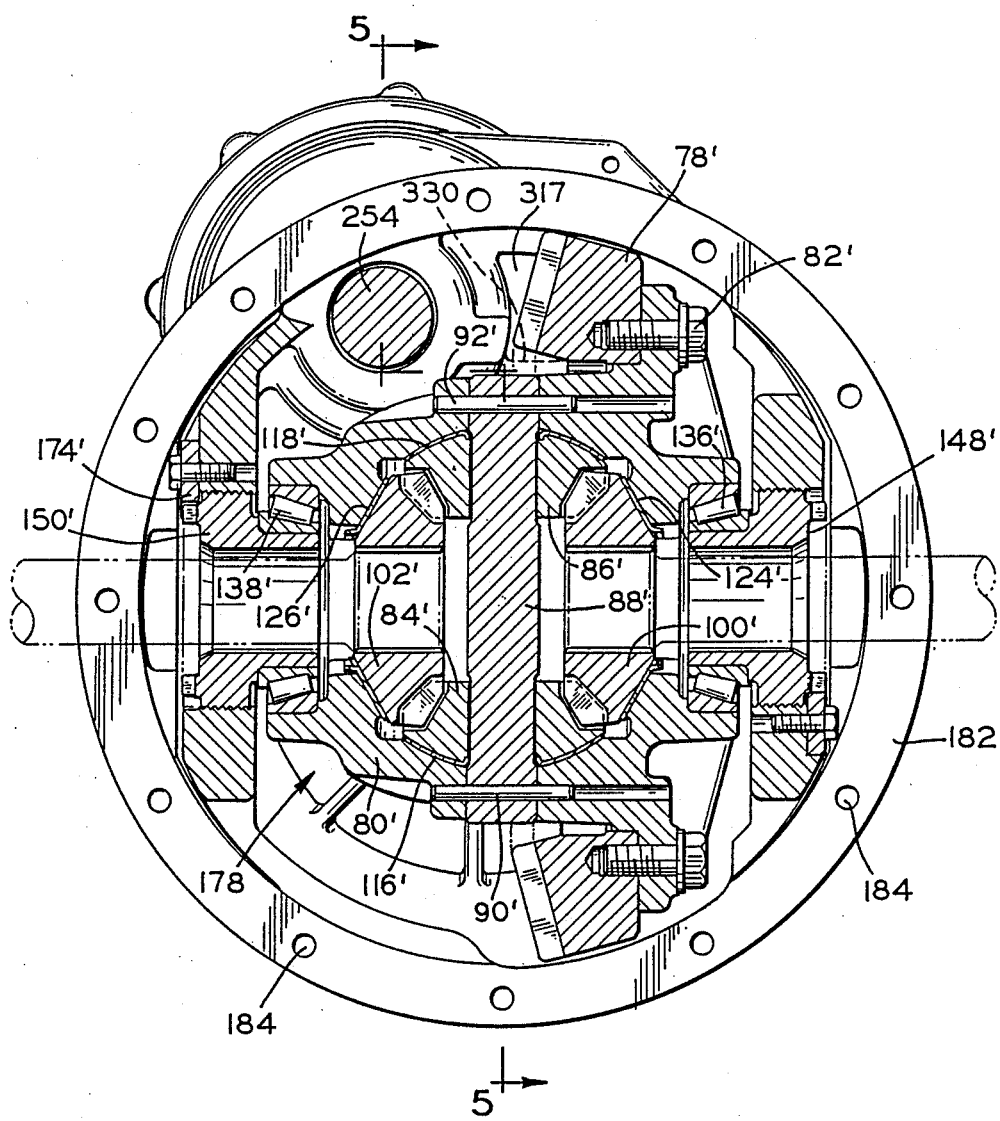
FIG. 6 is a sectional view of the interaxle differential assembly of FIG. 5, taken along the line 6—6 in FIG. 5.
Figure 7:
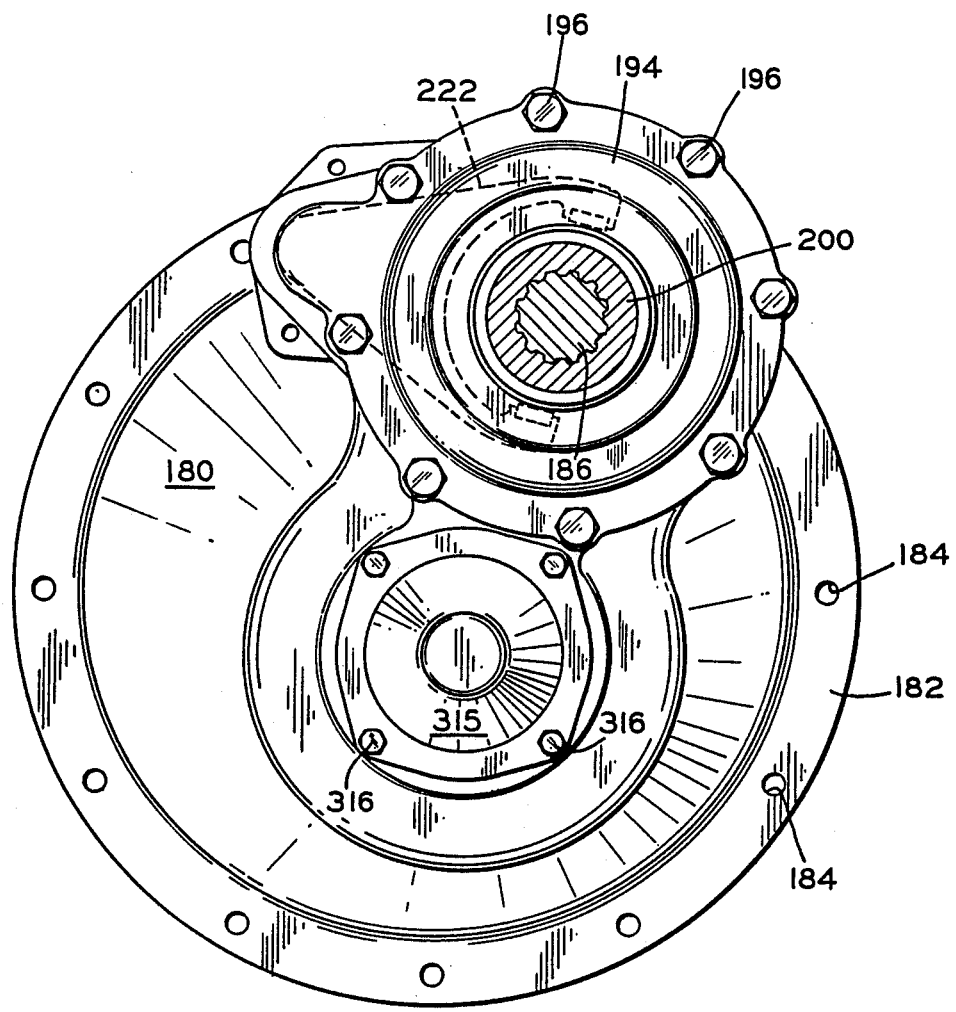
FIG. 7 is a sectional end view of an interaxle differential assembly according to the invention taken along the line 7—7 in FIG. 5.

As will be appreciated, many of the features shown in the rear differential 28 of FIGS. 2 and 3 are also utilized in the interaxle front differential 22 illustrated in FIGS. 5-7. For example, in FIGS. 5 and 6, a differential mechanism 178 used to drive the wheels 54, the bearing structure utilized to support the differential mechanism 178, and the method of installing the differential mechanism within the associated housing can all be similar to that of the rear differential 28. Thus, to simplify the description, components in the front differential 22 similar to those in the rear differential 28 will be identified by similar, but primed, reference numerals such as pinion gear 60'.

As shown in FIG. 5, the interaxle front differential 22 includes a main housing 180 which defines a flange section 182 having a plurality of bolt holes 184 formed therein for bolting the housing 180 onto the housing 42. The input yoke 30 is fastened to an input shaft 186 by a nut and washer assembly 188 applied to a threaded stud 190 integral with the shaft 186. The input yoke 30 is rotationally interlocked to the input shaft 186 by mating splines 192. An input cap 194 (also shown in FIG. 7) is bolted to the housing 180 by bolts 196. The input cap 194 is provided with an aperture into which an inner collar 200 of the yoke 30 extends. An annular seal means 202 is positioned between the cap 194 and the yoke collar 200. Also, the cap 194 includes an annular recessed mounting surface 204 for receiving a tapered roller bearing 206 which rotatably supports the front end of the shaft 186.

The shaft 186 includes an intermediate splined portion 214 which carries a gear 216 which, if desired, can be used to drive an oil pump (not shown) attached to an external portion of the housing 180. The gear 216 is preferably installed next to a snap ring 218 which serves to locate the gear 216. A dog clutch ring 220 having internal splines engageable with the splined portion 214 is moveable axially along the splined portion 214 by a shifting fork 222 (also shown in FIG. 7) which engages an annular groove formed in the clutch ring 220. The shift fork 222 can be actuated in a conventional fashion such as by a solenoid, for example.

As shown in FIG. 5, a disk-shaped input side gear 230, which is one component of an interaxle differential 231, is freely rotatably mounted on the shaft 186. The gear 230 has a first front planar surface 232, having a plurality of circumferentially spaced, inset dog clutch teeth 234 for selective engagement with external teeth 235 on the clutch ring 220. The gear 230 has a second rear planar surface 236 opposite the surface 232, and which defines a plurality of inset side gear teeth 238 for engagement with a set of four differential pinion gears 240 (only two shown in FIG. 5). It will be appreciated that both the dog clutch teeth 234 and the side gear teeth 238 are formed inwardly of their respective planar surfaces 232 and 236. It has been found that such a construction reduces the overall axial length of the interaxle differential mechanism as compared with prior art assemblies.

The pinion gears 240 are rotatably mounted on a pinion gear carrier 242, which is fastened to the shaft 186 at a second mating rear splined portion 244. The shaft 186 has a bearing end 246 which is received in an aperture in a neck portion 248 of a side gear 250. The side gear 250 is rotatably mounted in the housing 180 by a bearing 252, and engages the teeth of the pinion gears 240. The side gear 250 and an output shaft shown as an output shaft 254 are non-rotatably interconnected through the neck portion 248 by mating splines 256.

The rear end of the shaft 254 is mounted to the output yoke 34 by mating splines 255, and is secured thereto by means of a nut 256 fastened to a threaded stud 258 integral with the shaft 254. The yoke 34 includes a collar portion 262, adjacent the mating spline section 255, which passes through an annular seal means 264 into a rear housing 266. The rear housing portion 266 is fastened to the differential housing 42. The rear end of the shaft 254 is rotatably supported within the housing 266 by opposed tapered roller bearings 268 and 270.

The disk-shaped gear 230 also carries radial peripheral gear teeth 280 for engagement with teeth 282 of an output gear shown as the gear 284. The gear 284 is non-rotatably affixed to an output shaft shown as the pinion shaft 286 by mating splines 288. The rearmost end of the shaft 286 carries the pinion gear 60', corresponding to the pinion gear 60 of FIGS. 2 and 3. A tapered roller bearing 290 rotatably supports the rear end of the shaft 286 relative to the housing 180. A spacer ring 298 is interposed between the inner race of the bearing 290 and the gear 284. A second spacer 300 is interposed between the gear 284 and an inner race of a tapered roller bearing 302 which rotatably supports the front end of the shaft 286. The pinion shaft 286 is pre-loaded by means of a nut 310 fastened to a threaded stud 312 integral with the shaft 286. The nut 310 presses a washer 314 against the inner race of the bearing 302. This adjustment may be made after initial assembly and before the installation of a cover 315. The cover 315 is mounted by bolts 316 to the housing 180. A plan view of the cover 315 is best seen in FIG. 7.

Thus, as best illustrated in FIG. 5, when the drive shaft 24 is rotated, rotating the input yoke 30, the pinion carrier 242 is rotated. This causes the interaxle differential mechanism 231 to divide the power provided by the drive shaft 24 between the side gear 250 and the disk shaped gear 230. The gear 230 acts through the gear 284 and the pinion gear 60' to drive a ring gear 78' of a single axle differential mechanism, having a structure similar to the differential assembly of FIGS. 2 to 4. The power applied to the side gear 250 passes through the shaft 254 to the output yoke 34, which drives the intermediate drive shaft 26. The intermediate drive shaft 26 drives the input yoke 38 of the single rear differential shown in FIGS. 2 and 3, so that each of the four wheel assemblies of the wheel assemblies 54 and 56 may rotate at different speeds as required by cornering and uneven road conditions.

However, when the teeth 235 of the dog clutch ring 220 are slid into engagement with the teeth 234 of the disk-shaped gear 230, the gear 230 becomes locked to the shaft 186. With the pinion carrier 242 also non-rotatable with respect to the shaft 186, the interaxle differential mechanism 231 forms a solid connection between tne input yoke 30 and the output yoke 34, so that the two wheel assembly pairs 54 and 56 cannot operate at different average speeds. This is advantageous when the traction of the wheel assemblies 54 and 56 to the ground or supporting surface is marginal.

In operation of an interaxle differential assembly, when the associated vehicle is moving, the rotation of the ring gear 78' causes lubricating oil (not shown) in a main oil sump 318 to be flung towards the area of the interaxle differential mechanism 231 through an opening 317 (shown in FIG. 6), thus lubricating the interaxle differential and also lubricating all bearings that are above the normal level of lubricating oil in the main oil sump 318. However, as is conventional, and as illustrated, rolling elements are not interposed between the pinion gear carrier 242 and the pinion gears 240 or between the input shaft and the interaxle differential input side gear, so that these elements may move with rubbing friction for a very brief period of time when the associated vehicle first begins to move after a lengthly stopped period. Because of this, these components are considered wear parts which must be replaced, although at quite infrequent intervals. In response to this problem, interaxle differential assemblies have been provided with separate lubricating pumps externally mounted to provide start-up lubrication. Although such a lubricating pump may be used with the interaxle differential of the present invention, it is not necessary because of the provision of a simple, yet effective, secondary lubricant sump which will now be discussed.

Referring to FIG. 5, it can be seen that the housing 180 includes an internal support portion 319 which extends below the interaxle differential mechanism 231 and is used to support the outer races of the bearings 252 and 290. The portion 319 also functions to partially enclose the lower half of the interaxle differential mechanism 231 in the area 320. However, as will be appreciated, without the present invention, lubricating oil which normally enters the area 320 by means of the ring gear 78' would drain back into the main sump 318.

The function of a separate secondary lubricant sump for the interaxle differential 231 may be accomplished by providing an apertured cup member 322 partially enclosing the pinion carrier 242. The cup member 322 has a centrally located aperture 323 formed therein through which the shaft 186 extends, and an outer annular lip 324 secured to the internal support portion 319. The aperture 323 also provides clearance for the teeth of the pinion gears 240 and the teeth 238 of the disk-shaped gear 230. The secondary lubricant sump formed by the addition of this apertured cup member 322 is sealed by an annular lip seal means 326 disposed in an annular groove in the rear face of the disk-shaped input gear 230, and in sealing contact with the front surface of the apertured cup member 322. Thus, when operation of the vehicle causes the rotation of the ring gear 78' to throw lubricating fluid into the area of the interaxle differential, it will be trapped in the lubricant sump 320 defined by the internal support portion 319 of the housing 180, the apertured cup member 322, the lip seal 326, and the disk-shaped gear 230.

Also, in FIG. 5, an O-ring 328 is positioned within an annular groove formed in the housing 180 for sealingly contacting the neck portion 248 of the side gear 250. In the embodiment shown in FIG. 5, the level of oil in the secondary lubricant sump 320 will be limited by the lowermost portion 230 of the opening 317 through which the oil is flung by the ring gear 78. Thus, with the present invention, start-up lubrication will be provided to the interaxle differential 231 the next time the associated vehicle is moved.

To further assist in the lubrication of the interaxle differential, the disk-shaped side gear 230 is provided with a plurality of circumferentially spaced oil passageways 332 which extend from the side gear teeth 238 to the inner bore provided in the gear 230. Similarly, the side gear 250 is provided with oil passageways 334 which extend from the respective side gear teeth to the associated inner bore area. It has been found that, when operating, the rotating pinion gears 240 produce a pumping action which forces oil through the passageways 332 and 334 and into the inner bore areas of the gears 230 and 250. Thus, additional lubricating oil is provided between the inner bore surfaces of the gears 230 and 250 and the corresponding contacting outer surface portions of the shaft 186.

It will be appreciated that numerous modifications and variations of the disclosed embodiments of the invention may be easily made by one skilled in the art without departing from the spirit and scope of the claimed invention.

What is claimed is:

1. A differential assembly, comprising:
    a housing means;
    an input shaft rotatable about an axis and being disposed in said housing means and carrying a first differential side gear means, said first side gear means being provided with first side gear teeth engageable with at least two differential pinion gear means;
    each of said pinion gear means being rotatably mounted to a carrier means mounted for rotation with said input shaft, each of said pinion gear means having an axis of rotation perpendicular to and intersecting the axis of said input shaft;
    an output shaft rotatable about an output axis coincident with said input shaft axis, said output shaft having a second differential side gear means non-rotatably mounted thereon and having gear teeth engageable with said pinion gear means;
    said first and second side gear means, said carrier means, and said pinion gear means cooperating to define a differential mechanism;
    said housing means including means for at least partially enclosing at least a lower portion of said differential mechanism;
    an apertured cup member affixed to said housing and surrounding said input shaft, said cup member being located between said carrier means and said first side gear means;

an annular seal means positioned between and sealingly contacting said apertured cup member and said first side gear means;

said housing means, said apertured cup member, said annular seal means, and said first side gear means defining a lubricant sump for said differential mechanism.

2. The differential assembly according to claim 1 wherein said output shaft is first output shaft and including a second output shaft spaced transversely from said input shaft and wherein:

said first side gear means is a disk-shaped gear means rotatably disposed about said input shaft and including a first generally planar surface, a second generally planar surface, and a radial periphery defining peripheral gear teeth engageable with a first output gear affixed to said second output shaft;

a locking means adapted to rotate with said input shaft and axially moveable along said input shaft in response to shifter fork means, said locking means defining a plurality of projecting clutch teeth and being disposed adjacent said first planar surface of said disk-shaped first side gear means;

a plurality of internally formed mating clutch teeth being defined in said first planar surface of said first side gear means for engagement with said clutch teeth of said locking means;

said second planar surface of said first side gear means having a plurality of side gear teeth formed therein defining said first side gear means and engageable with said differential pinion gear means.

3. The differential assembly according to claim 1 including an annular seal means carried by said housing means and sealing engaging a neck portion of said second side gear means.

4. The differential assembly according to claim 1 wherein said first side gear means has a first bore for rotatably receiving said input shaft and is provided with at least one oil passageway formed therein extending between said first side gear teeth and said first bore.

5. The differential assembly according to claim 4 wherein said input shaft includes an end portion which is rotatably received within a second bore provided in said second side gear means and wherein said second side gear means is provided with at a least one oil passageway extending between said second side gear teeth and said second bore.

6. The differential assembly according to claim 1 wherein said first side gear means is a disk-shaped gear means having a first and second generally planar surfaces.

7. The differential mechanism according to claim 6, wherein a plurality of side gear teeth are formed in said second planar surface to define said side gear means.

8. The differential assembly according to claim 7, wherein said annular seal means is disposed in a groove formed in said second planar surface, said seal means including a sealing element for sealingly contacting said cup member.

9. A bevel gear differential assembly, comprising:

a first shaft rotatable about an axis;

a first differential side gear having an annular bore for rotatably receiving and engaging an annular surface portion of said first shaft;

a pinion gear carrier means affixed to said first shaft and carrying at least two beveled differential pinion gears thereon, each of said pinion gears having an axis of rotation perpendicular to and intersecting said axis of said first shaft;

said first differential side gear having a plurality of first beveled side gear teeth formed therein engageable with said beveled differential pinion gears; and a second shaft rotatable about an axis coincident with the axis of rotation of said first shaft and having a second differential side gear mounted thereon, said second differential side gear defining second beveled side gear teeth engageable with said beveled differential pinion gears;

said first differential side gear being provided with at least one oil passageway formed therein extending between said first beveled side gear teeth and said first bore for supplying lubricating oil to said annular surface portion of said first shaft.

10. The differential assembly according to claim 9 wherein said first shaft includes an end portion which is rotatably received within and engages a second bore provided in said second differential side gear, and wherein said second differential side gear is provided with at least one oil passageway extending between said second beveled side gear teeth and said second bore.

* * * * *